(12) United States Patent
Yoo et al.

(10) Patent No.: US 10,452,976 B2
(45) Date of Patent: Oct. 22, 2019

(54) NEURAL NETWORK BASED RECOGNITION APPARATUS AND METHOD OF TRAINING NEURAL NETWORK

(71) Applicant: SAMSUNG ELECTRONICS CO., LTD., Suwon-si (KR)

(72) Inventors: Byungin Yoo, Seoul (KR); Youngsung Kim, Suwon-si (KR); Youngjun Kwak, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 15/463,553

(22) Filed: Mar. 20, 2017

(65) Prior Publication Data

US 2018/0068218 A1 Mar. 8, 2018

(30) Foreign Application Priority Data

Sep. 7, 2016 (KR) .......................... 10-2016-0115108

(51) Int. Cl.
| | |
|---|---|
| *G06N 3/08* | (2006.01) |
| *G06K 9/46* | (2006.01) |
| *G06K 9/62* | (2006.01) |
| *G06N 3/04* | (2006.01) |
| *G06K 9/00* | (2006.01) |

(52) U.S. Cl.
CPC ................ *G06N 3/08* (2013.01); *G06K 9/00* (2013.01); *G06K 9/4604* (2013.01); *G06K 9/6232* (2013.01); *G06N 3/04* (2013.01); *G06N 3/0454* (2013.01); *G06N 3/084* (2013.01)

(58) Field of Classification Search
CPC ........ G06N 3/08; G06N 3/0454; G06N 3/084; G06N 3/04; G06K 9/6232; G06K 9/4604
See application file for complete search history.

(56) References Cited

U.S. PATENT DOCUMENTS

| | | |
|---|---|---|
| 9,286,524 B1 | 3/2016 | Mei et al. |
| 2010/0316283 A1 | 12/2010 | Greer |

(Continued)

FOREIGN PATENT DOCUMENTS

| | | |
|---|---|---|
| KR | 10-2013-0048299 A | 5/2013 |
| KR | 10-1412727 B1 | 7/2014 |

OTHER PUBLICATIONS

Yang, KeunWha, et al. "Face Recognition by Combining Classifiers: Multi-layer Neural Networks vs. Radial Basis Function Networks." *Journal of Korean Institute of Information Technology* 3 (2007) (9 pages, in Korean with English abstract).

*Primary Examiner* — Menatoallah Youssef
(74) *Attorney, Agent, or Firm* — NSIP Law

(57) ABSTRACT

A neural network recognition method includes obtaining a first neural network that includes layers and a second neural network that includes a layer connected to the first neural network, actuating a processor to compute a first feature map from input data based on a layer of the first neural network, compute a second feature map from the input data based on the layer connected to the first neural network in the second neural network, and generate a recognition result based on the first neural network from an intermediate feature map computed by applying an element-wise operation to the first feature map and the second feature map.

11 Claims, 16 Drawing Sheets

(56) References Cited

U.S. PATENT DOCUMENTS

| | | | |
|---|---|---|---|
| 2015/0036920 A1* | 2/2015 | Wu .................... | G06N 3/0454 |
| | | | 382/156 |
| 2016/0019459 A1 | 1/2016 | Audhkhasi et al. | |
| 2016/0078369 A1 | 3/2016 | Frank et al. | |
| 2016/0099010 A1 | 4/2016 | Sainath et al. | |
| 2017/0076195 A1* | 3/2017 | Yang .................... | G06N 3/063 |

* cited by examiner

NEURAL NETWORK BASED RECOGNITION APPARATUS AND METHOD OF TRAINING NEURAL NETWORK

CROSS-REFERENCE TO RELATED APPLICATION

This application claims the benefit under 35 USC § 119(a) of Korean Patent Application No. 10-2016-0115108 filed on Sep. 7, 2016, in the Korean Intellectual Property Office, the entire disclosure of which is incorporated herein by reference for all purposes.

BACKGROUND

1. Field

The following description relates to technology that trains a neural network or performs recognition using the trained neural network.

2. Description of Related Art

Recently, to classify a human input pattern, active research on applications of an efficient pattern recognition method employing some portions which are similar to a method a human might employ, to an actual computer is being conducted. One such area of research is focused on an artificial neural network, such as e.g. a neuromorphic processor modelling a number of synapse-connected neurons, that models characteristics of biological nerve cells of a human through mathematical expressions or physical logical gates, such as, for example, in a field programmable gate array (FPGA). To classify the input pattern, the artificial neural network employs an approach incorporating portions of algorithms and methods that simulates certain learning capabilities of a biological brain such as an e.g. human. The artificial neural network generates mapping between the input pattern and output patterns. The capability of generating such a mapping is referred to as a learning capability of the artificial neural network. Based on the learning result, the artificial neural network generates an output with respect to an input pattern yet to be used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network recognition method including obtaining a first neural network that includes a plurality of layers and a second neural network that includes a layer connected to the first neural network, actuating a processor to compute a first feature map from input data based on a layer of the first neural network, compute a second feature map from the input data based on the layer connected to the first neural network in the second neural network, and generate a recognition result based on the first neural network from an intermediate feature map computed by applying an element-wise operation to the first feature map and the second feature map.

The computing of the first feature map may include computing the first feature map corresponding to the input data based on a previous layer of a target layer included in the first neural network.

The generating may include computing the recognition result from the intermediate feature map based on a next layer of the target layer included in the first neural network.

The computing of the second feature map may include computing the second feature map corresponding to the input data based on a layer connected to a target layer included in the first neural network, among a plurality of layers included in the second neural network, and transmitting the second feature map to the first neural network.

The complex recognition method may further include preprocessing the second feature map and transmitting the preprocessed second feature map to the first neural network.

The complex recognition method may further include generating a recognition result from the input data based on the second neural network.

A number of nodes included in a layer of the first neural network may be equal to a number of nodes included in the layer connected to the first neural network.

The complex recognition method may further include computing a third feature map corresponding to at least one of the plurality of layers in the first neural network, and transmitting the third feature map to a third neural network.

The complex recognition method may further include computing a feature map of a target layer included in the first neural network based on the target layer from a feature map of a previous layer included in the first neural network in response to the target layer being connected to the previous layer. The target layer may be connected only to the previous layer.

The generating may include computing resulting elements by applying the element-wise operation to an individual element of the first feature map and an element corresponding to the individual element in the second feature map, and generating a set of the resulting elements as the intermediate feature map.

In another general aspect, there is also provided a training method for neural network recognition, the training method including obtaining a first neural network that includes a plurality of layers and a second neural network that includes a layer connected to the first neural network, actuating a processor to: apply an element-wise operation of a first feature map computed from a training input based on a layer of the first neural network and a second feature map computed from the training input based on the layer connected to the first neural network in the second neural network, and train the first neural network and the second neural network based on a first training recognition result computed by the first neural network through a result of the element-wise operation and a first training output corresponding to the training input.

The training may include back-propagating a loss corresponding to the first training recognition result and the first training output from an output layer to an input layer of the first neural network.

The training may include back-propagating a loss corresponding to the first training recognition result and the first training output to the second neural network through the layer connected to the first neural network.

The training method may further include training the second neural network based on a second training recognition result computed by the second neural network from the training input and a second training output corresponding to the training input.

The applying may include preprocessing the second feature map, and applying the element-wise operation to the first feature map and the preprocessed second feature map.

The first neural network and the second neural network may include the same layer structures and parameters.

A number of nodes included in a layer of the first neural network may be equal to a number of nodes included in the layer connected to the first neural network.

The training may include training the first neural network based on a third training recognition result computed by a third neural network and a third training output corresponding to the training input.

In still another general aspect, there is also provided a neural network recognition method including obtaining a neural network that includes a plurality of layers, actuating a processor to: compute a feature map corresponding to input data from one of the plurality of layers, apply an element-wise operation to the feature map, and compute a recognition result from a result of the element-wise operation based on at least one of the plurality of layers.

A non-transitory computer-readable storage medium may store program instructions that, when executed by a processor, cause the processor to perform such methods.

Other features and aspects will be apparent from the following detailed description, the drawings, and the claims.

Figure 1:
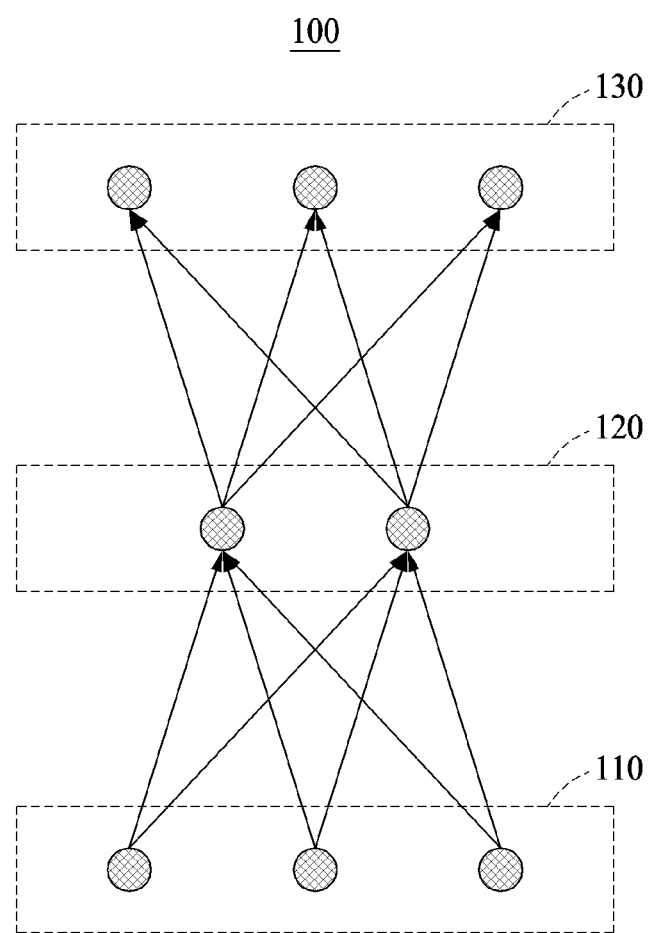
FIG. 1 illustrates an example of a neural network in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application to one of ordinary skill in the art, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a neural network in accordance with an embodiment.

A method and apparatus for performing complex recognition is suggested based on a neural network 100, and a method and apparatus for training the neural network 100 is suggested. Herein, recognition includes verification and identification. Verification is an operation of determining whether input data is true or false (or likely, unlikely amongst a binary choice or a plurality, i.e. 2 or more choices), and identification is an operation of determining a label indicated by input data, among a plurality of labels.

A structure of the neural network 100 will be described below in advance of describing complex recognition.

The neural network 100 includes a plurality of layers, each including a plurality of nodes. The neural network 100 includes connection weights to connect the plurality of nodes included in each of the plurality of layers to a node included in another layer. A training apparatus obtains or generates the neural network 100 from an internal database or databases stored in one or more memory storage locations, and/or receives the neural network 100 from an external server through a communicator.

For example, the neural network 100 is a recognition model that simulates a computation capability of a biological system using a large number of artificial neurons connected through edges. The neural network 100 may also be referred to as an artificial neural network.

The neural network 100 uses artificial neurons configured by selectively employing and combining functions of biological neurons. The artificial neurons may also be referred to as nodes. The artificial neurons are connected to each other through edges having connection weights. The connection weights are predetermined (or dynamically generated) values of the edges (based on analytical evaluation of input data and/or relationships), and may also be referred to as synapse weights or connection strengths.

The neural network 100 includes a plurality of layers. For example, the neural network 100 includes an input layer 110, a hidden (or intermediate) layer 120, and an output layer 130. The input layer 110 receives an input to be used to perform training or recognition and transmits the input to the hidden layer 120. The output layer 130 generates an output of the neural network 100 based on signals (or indicia) received from the hidden layer 120. The hidden layer 120 is disposed between the input layer 110 and the output layer 130. The hidden layer 120 changes a training input of training data received from the input layer 110 to an easily predictable value.

The input layer 110, the hidden layer 120, and the output layer 130 each include a plurality of nodes. The nodes included in the input layer 110 are referred to as input nodes, the nodes included in the hidden layer 120 are referred to as hidden nodes, and the nodes included in the output layer 130 are referred to as output nodes.

The input nodes included in the input layer 110 and the hidden nodes included in the hidden layer 120 are connected to each other through edges having connection weights indicating the likelihood of an actual connection. The hidden nodes included in the hidden layer 120 and the output nodes included in the output layer 130 are also connected to each other through edges having connection weights.

Figure 5:
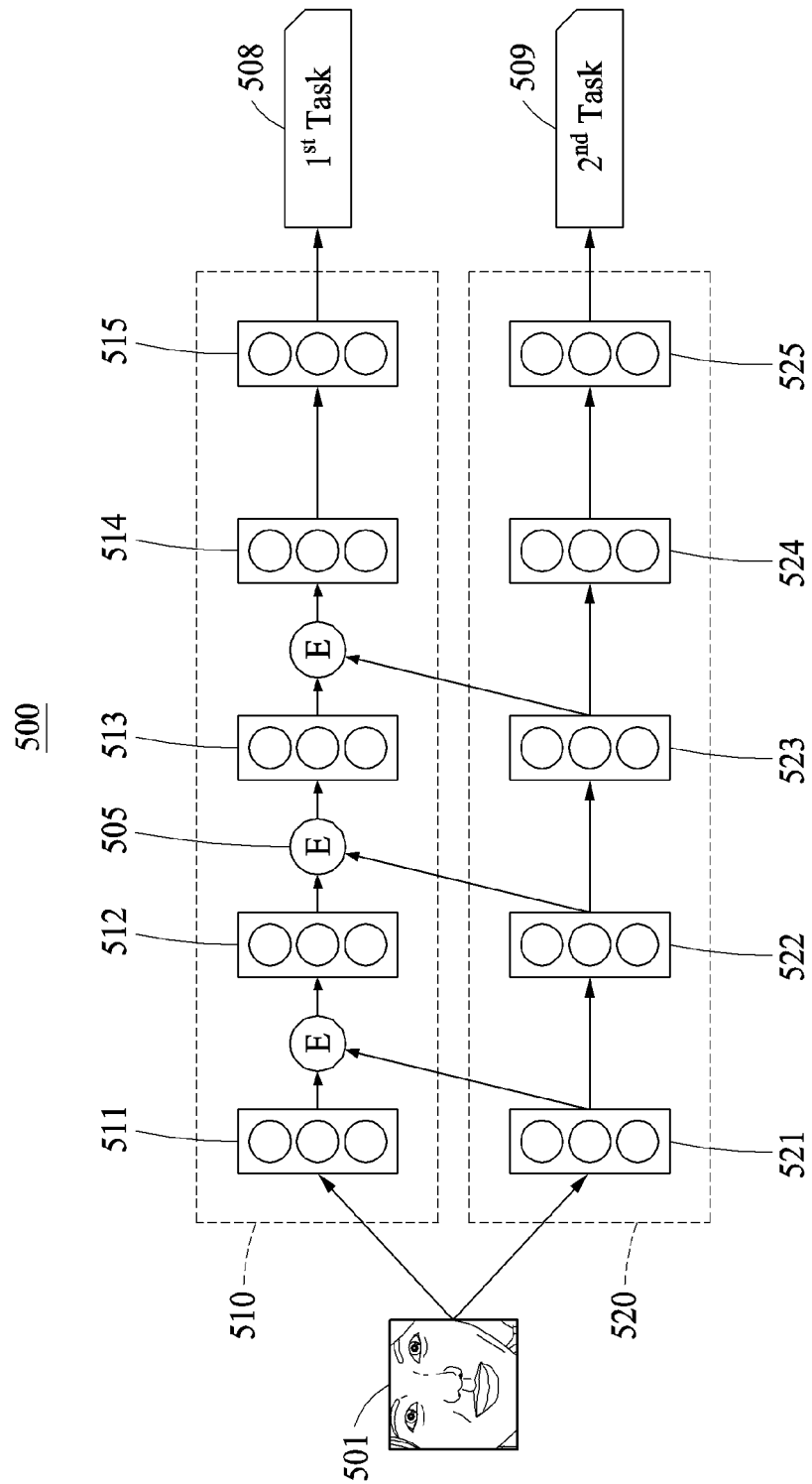
FIG. 5 illustrates an example of a neural network structure for complex recognition in accordance with an embodiment.

While a single hidden layer is shown in FIG. 1 for conciseness and clarity, the neural network may include a plurality of hidden layers (such as seen, for example, in FIG. 5). A neural network including a plurality of hidden layers may be referred to as a deep neural network. Training the deep neural network may be referred to as deep learning. Assuming that the hidden layer 120 includes a first hidden layer, a second hidden layer, and a third hidden layer, an output of a hidden node included in the first hidden layer may be connected to hidden nodes belonging to the second hidden layer. An output of a hidden node belonging to the second hidden layer may be connected to hidden nodes belonging to the third hidden layer.

For example, the training apparatus and a recognition apparatus input outputs of previous hidden nodes included in a previous hidden layer into each hidden layer through edges having connection weights, and generate outputs of hidden nodes included in a hidden layer based on values obtained by applying the connection weights to the outputs of the previous hidden nodes and activation functions. To connect or generate and transmit a signal output to a next hidden node, a result of the activation functions needs to exceed a threshold of a current hidden node. In this example, a node maintains a deactivated state without firing (or sending) a signal to a next node until a predetermined threshold strength of activation is reached through input vectors.

The training apparatus trains the neural network 100 through supervised learning. The training apparatus is implemented, according to embodiment, as software modules, hardware modules, or a combination thereof. Supervised learning refers to a method of inputting a training input of training data and a corresponding training output into the neural network 100, and updating connection weights of edges so that output data corresponding to the training output of the training data may be output. Although FIG. 1 illustrates the structure of the neural network as a structure of nodes, examples are not limited thereto. Various data structures may be used to store the neural network in a memory storage such as, e.g. a relational database, a data store, a linked-list structure, stacks, or any other suitable memory storage.

According to one or more embodiments, the training apparatus determines parameters of the nodes through a gradient descent scheme which is based on a loss to be back-propagated to the neural network and output values of the nodes included in the neural network. For example, the training apparatus updates the connection weights among the nodes through loss back-propagation learning. Loss back-propagation learning refers to a method of estimating a loss with respect to provided training data through forward computation, and updating connection weights to reduce the loss while propagating the estimated loss in a backward direction from the output layer 130 toward the hidden layer 120 and the input layer 110. Processing of the neural network 100 is performed in an order of the input layer 110, the hidden layer 120, and the output layer 130. However, in the loss back-propagation learning, the connection weights are updated in an order of the output layer 130, the hidden layer 120, and the input layer 110. To process the neural network as desired, one or more processors use a buffer memory configured to store layers or a series of computed data.

The training apparatus defines an objective function to be used to measure optimalities of currently set connection weights, continuously changes the connection weights based on a result of the objective function, and iteratively performs training. For example, the objective function is a loss function to be used by the neural network 100 to calculate a loss between an actual output value and a value expected to be output with respect to a training input of training data. The training apparatus updates the connection weights to reduce a value of the loss function.

Figure 2:
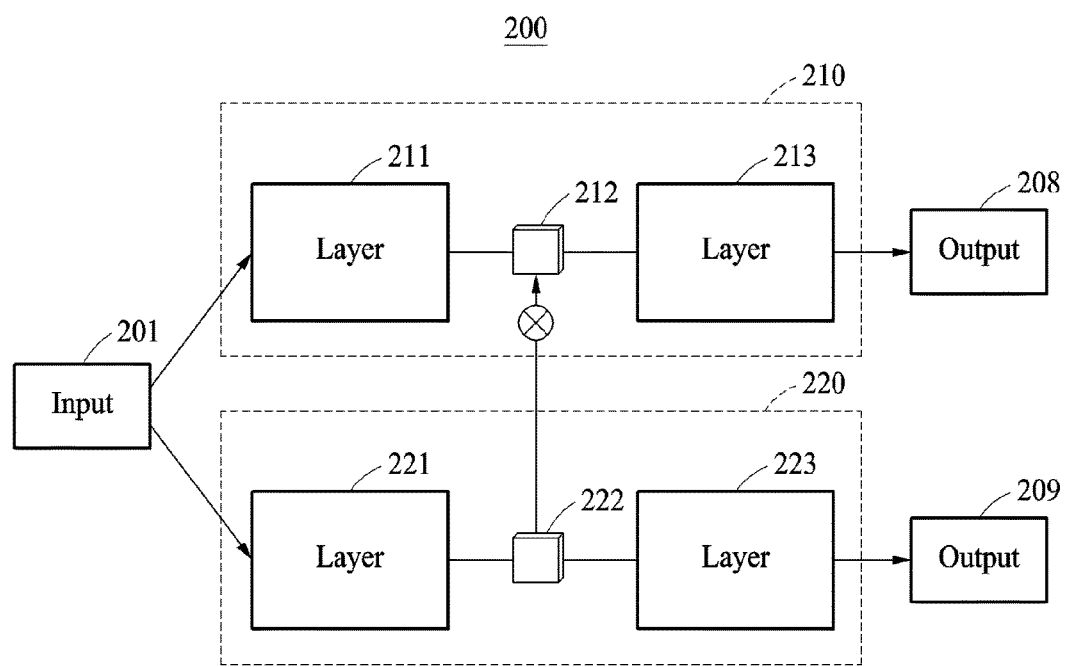
FIG. 2 illustrates an example of a neural network structure for complex recognition in accordance with an embodiment.

FIG. 2 illustrates an example of a neural network structure for complex recognition in accordance with an embodiment.

A recognition apparatus generates an output of each layer included in a neural network structure 200 in a form of a feature map. The feature map is a set of values extracted based on a parameter corresponding to each layer from data provided as an input of the layer, and represents data related to features of the data provided as an input. For example, the feature map is expressed in a form of n×m-dimensional vector or matrix, n and m being integers greater than or equal to "1".

The neural network structure 200 suggested for complex recognition includes at least one neural network. The neural network structure 200 for complex recognition includes, according to one or more embodiments, a plurality of neural networks 210 and 220, and one neural network 210 is configured to use outputs of layers of the other neural network 220.

Hereinafter, a process of the recognition apparatus computing outputs 208 and 209 from an input 201 using the neural network structure 200 of FIG. 2 will be described. For example, as shown in FIG. 2, the neural network 200 for complex recognition includes the first neural network 210 and the second neural network 220.

The recognition apparatus obtains the input 201. For example, the recognition apparatus receives the input 201 from an external device through wired communication and wireless communication. In another example, the recognition apparatus obtains data collected through a camera or microphone as the input 201. The recognition apparatus transfers the input 201 to input layers of the neural network structure 200.

The recognition apparatus transfers the same input 201 to an input layer of the first neural network 210 and an input layer of the second neural network 220.

For example, the recognition apparatus computes a feature map from the input 201 based on a parameter corresponding to the input layer of the first neural network 210, and transmits the feature map to a next layer connected to the input layer. The recognition apparatus generates an output feature map from an input feature map input into each layer of the first neural network 210 based on a parameter corresponding to the layer. The input feature map is a feature map input into each layer, and the output feature map is a feature map output from each layer.

As described above, with respect to all the layers included in the first neural network 210, the recognition apparatus computes an output feature map of each layer sequentially based on an order in which the layers are connected. The recognition apparatus generates the output 208 computed from an output layer which is the last layer of the first neural network 210. The output 208 computed from the output layer of the first neural network 210 is a recognition result of the first neural network 210 corresponding to the provided input 201.

Herein, the recognition apparatus and the training apparatus compute outputs of layers sequentially in a forward direction, and the training apparatus propagates a loss to the layers sequentially in a backward direction. Here, a layer subject to output computation or loss propagation at a predetermined point in time while the recognition apparatus or the training apparatus operates will be referred to as a target layer.

The recognition apparatus performs the same process described above with respect to each layer of the second neural network 220, and computes a feature map with respect to a layer not connected to the first neural network 210, among the layers included in the second neural network 220, irrespective of the layers of the first neural network 210.

A target layer of the first neural network 210 is connected to a layer of the second neural network 220. The recognition apparatus computes a feature map sequentially with respect to each previous layer 211 of a target layer 212 in the first neural network 210 based on an internal connection relationship of the first neural network 210 as described above.

The recognition apparatus computes a feature map sequentially with respect to each previous layer 221 of a layer 222 in the second neural network 220, the layer 222 connected to the target layer 212, based on an internal connection relationship of the second neural network 220.

In response to an output of the target layer 212 of the first neural network 210 needing to be computed, the recognition apparatus generates the output of the target layer 212 as follows. The recognition apparatus transmits an output, for example, a second feature map, of the layer 222 of the second neural network 220 to the target layer 212 of the first neural network 210. Here, the recognition apparatus applies an element-wise operation to the second feature map of the layer 222 included in the second neural network 220 and an output, for example, a first feature map, of the previous layer 211 of the target layer 212 in the first neural network 210. Thus, the recognition apparatus inputs a result of applying the element-wise operation to the first feature map and the second feature map, with respect to the target layer 212 of the first neural network 210. The recognition apparatus computes an intermediate feature map from the result of applying the element-wise operation to the first feature map and the second feature map based on a parameter corresponding to the target layer 212 of the first neural network 210.

Figure 10:
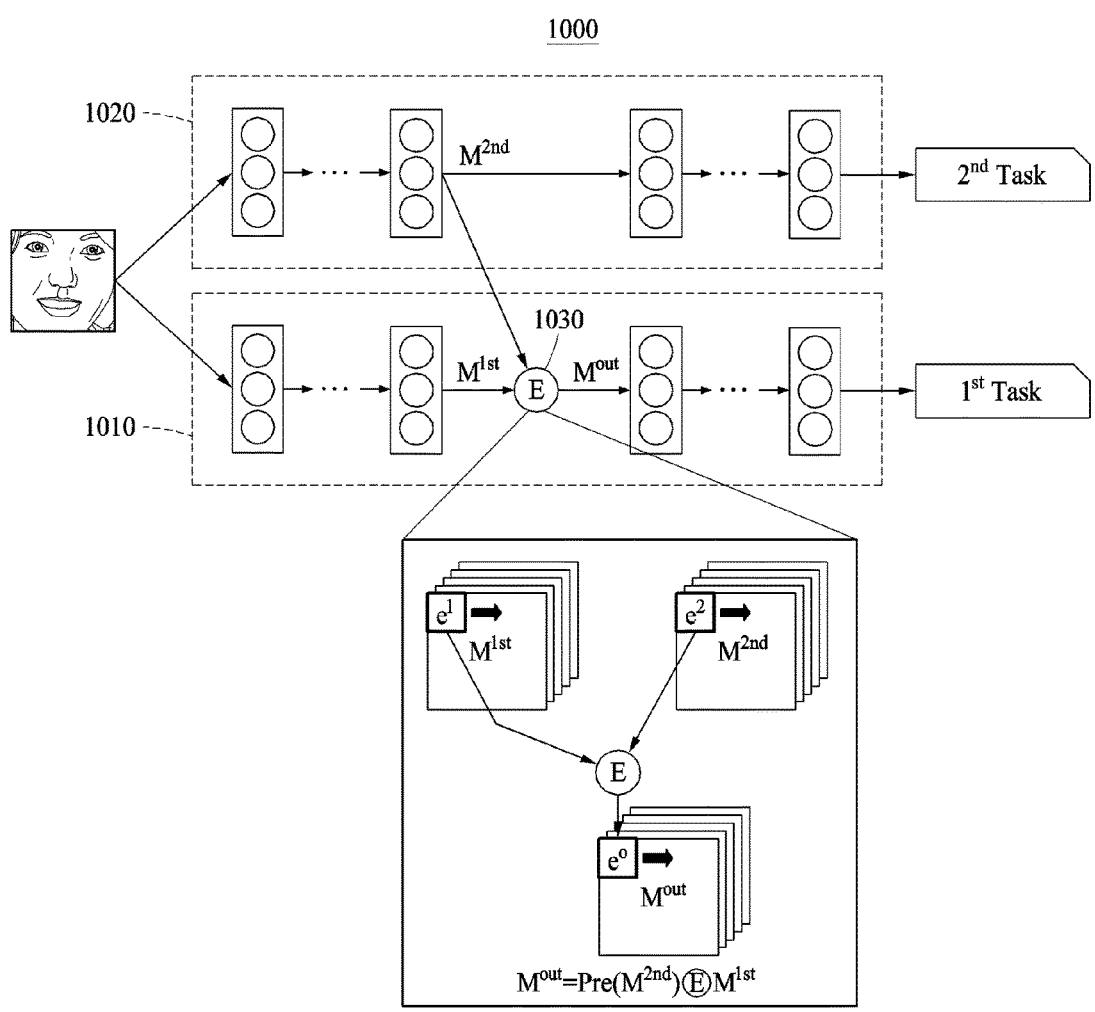
FIG. 10 illustrates an example of an element-wise operation performed with respect to neural networks, such as that of FIG. 5.

Herein, the element-wise operation is a process of applying a predetermined operation to corresponding elements in respective data, with respect to at least two items of k-dimensional data, k being an integer greater than or equal to "1". The data subject to the element-wise operation is, according to one or more embodiments, of the same dimension and includes the same number of elements. For example, in response to the respective data being n×m-dimensional vector data, the recognition apparatus applies the predetermined operation, for example, addition, to (i, j)-th elements in the respective vector data, i being an integer greater than or equal to "1" and less than or equal to "n", and j being an integer greater than or equal to "1" and less than or equal to "m". The element-wise operation includes, for example, operations as shown in FIG. 10. However, types of the element-wise operations are not limited thereto, and the element-wise operations include all operators that may be applied in common to corresponding elements in a plurality of items of data having the same dimension. The element-wise operation is further described with reference to FIG. 10.

The recognition apparatus computes a feature map from the intermediate feature map based on a parameter corresponding to each next layer 213 sequentially with respect to each next layer 213 of the target layer 212 in the first neural network 210. In response to the last layer of the next layers 213 being an output layer, a value output from the output layer is the output 208. The recognition apparatus computes a feature map sequentially with respect to each next layer 223 of the layer 222 of the second neural network 220, the layer 222 connected to the target layer 212. Here, the recognition apparatus excludes an output of each layer of the first neural network 210, from computing a feature map of each layer of the second neural network 220.

Thus, the recognition apparatus generates the output 208 of the first neural network 210 by reflecting intermediate information, for example, in a form of intermediate feature map, recognized by the second neural network 220 in the first neural network 210. Further, the recognition apparatus generates the output 209 of the second neural network 220, irrespective of the first neural network 210.

The first neural network 210 is trained for a first purpose, and the second network 220, according to one or more embodiments, is trained for a second purpose. Thus, the recognition apparatus is able to recognize multiple tasks corresponding to purposes using the first neural network 210 and the second neural network 220. In response to the first neural network 210 being configured to refer to an output of a layer of the second neural network 220, the recognition apparatus reflects a second task, for example, ethnicity recognition, corresponding to the second purpose in performing a first task, for example, face recognition, corresponding to the first purpose, thereby improving a recognition rate of the first task.

Although FIG. 2 illustrates a single layer being connected between the first neural network 210 and the second neural network 220, examples are not limited thereto. According to a design, number, position, or connection directions of layers being connected may vary. The connection directions are directions in which outputs of the layers are transmitted.

Figure 3:
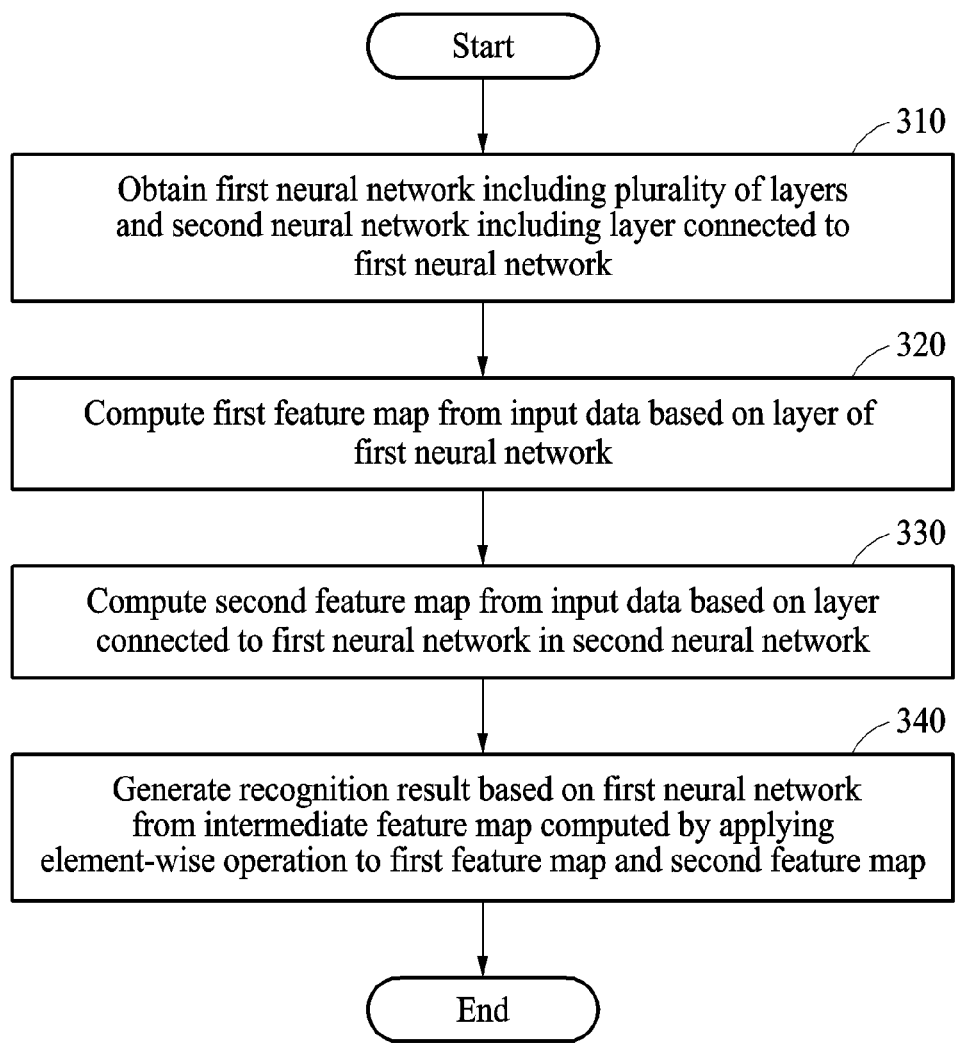
FIGS. 3 and 4 are flowcharts illustrating an example of a complex recognition method in accordance with an embodiment.
Figure 4:
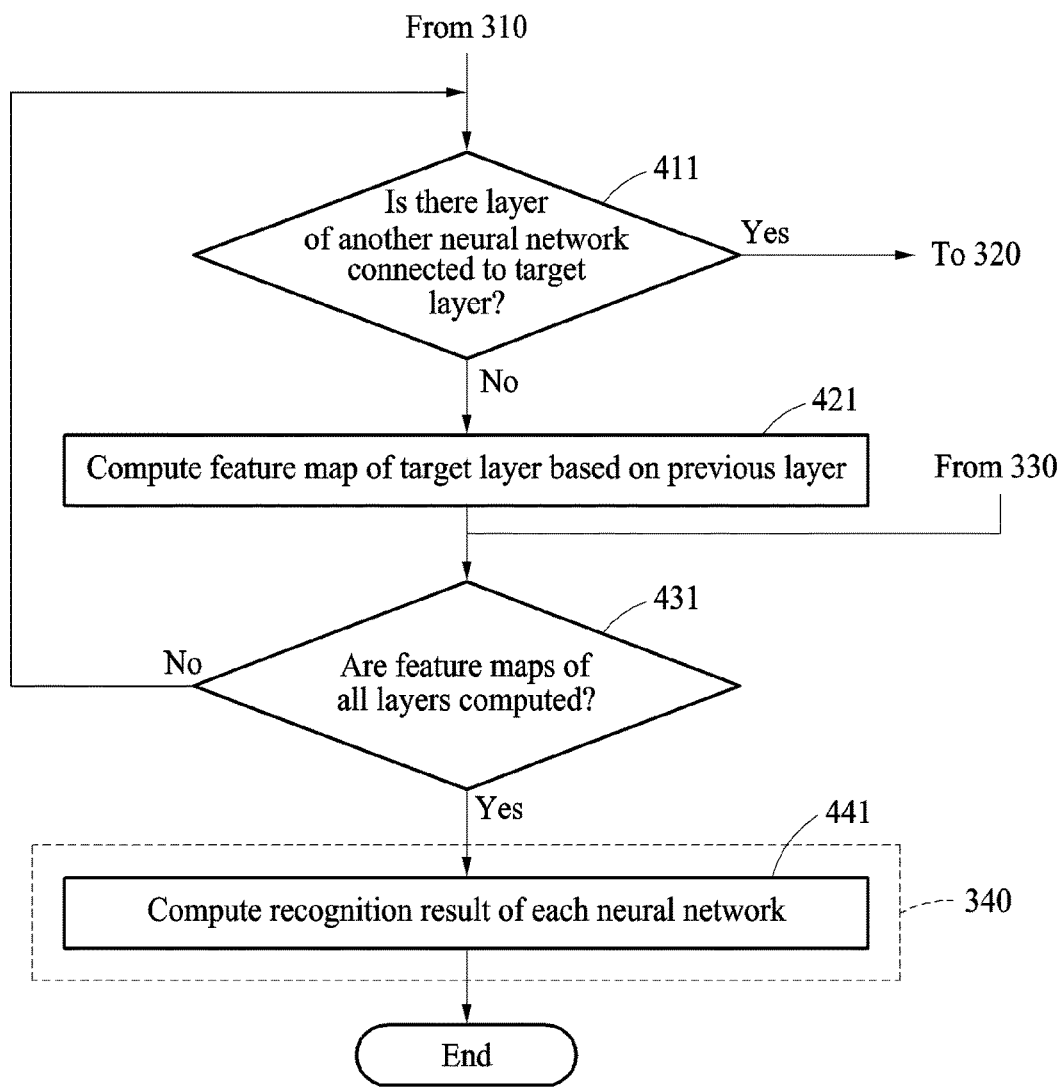

FIGS. 3 and 4 are flowcharts illustrating an example of a complex recognition method in accordance with an embodiment.

Referring to FIG. 3, in operation 310, a recognition apparatus obtains or generates a first neural network including a plurality of layers and a second neural network including a layer connected to the first neural network.

In operation 320, the recognition apparatus computes a first feature map from input data based on a layer of the first neural network. For example, the recognition apparatus computes the first feature map corresponding to the input data based on a previous layer of a target layer included in the first neural network.

In operation 330, the recognition apparatus computes a second feature map from the input data based on the layer connected to the first neural network in the second neural network. For example, the recognition apparatus computes the second feature map corresponding to the input data based on a layer connected to the target layer, among a plurality of layers included in the second neural network, and transmits the second feature map to the first neural network. Here, the recognition apparatus preprocesses the second feature map and transmits the preprocessed second feature map to the first neural network. The preprocessed feature map is applied to the first feature map as a weight. A preprocessing operation is described further with reference to FIG. 10.

However, there may not be a layer of another neural network connected to the target layer of the first neural network. Referring to FIG. 4, in operation 411, the recognition apparatus determines whether there is a layer of another neural network connected to the target layer. In response to a layer of another neural network being connected to the target layer, for example, in response to a layer of the second neural network being connected to the target layer of the first neural network, the recognition apparatus computes a feature map of the previous layer of the target layer and a feature map of the layer connected to the target layer in the other neural network, in operation 320 and 330, and computes an intermediate feature map of the target layer based on a result of applying an element-wise operation to the two feature maps.

In response to a layer of another neural network not being connected to the target layer, the recognition apparatus computes a feature map of the target layer based on the previous layer, in operation 421. For example, the recognition apparatus computes the feature map of the target layer from a feature map of the previous layer based on the target layer in response to the target layer included in the first neural network being connected to only the previous layer included in the first neural network. Since a layer of the second neural network is not connected to the target layer, the recognition apparatus excludes the second neural network from computing the feature map of the target layer in operation 421.

In operation 431, the recognition apparatus determines whether feature maps of all layers are computed. In response to feature maps of all layers not being computed, the recognition apparatus returns to operation 411 to repeat the above series of operations until an output of an output layer of each neural network is computed.

In operation 340, the recognition apparatus generates a recognition result based on the first neural network from an intermediate feature map computed by applying the element-wise operation to the first feature map and the second feature map. In response to feature maps of all layers being computed in operation 431, the recognition apparatus computes a recognition result of each neural network, in operation 441. For example, the recognition apparatus computes a recognition result from the intermediate feature map based on a next layer of the target layer included in the first neural network. In another example, the recognition apparatus generates a recognition result from the input data based on the second neural network. Here, the first neural network and the second neural network are trained to indicate different purposes with respect to the same input. However, examples are not limited thereto. The first neural network and the second neural network, according to one or more embodiments, are trained to indicate the same purpose.

FIG. 5 illustrates an example of a neural network structure for complex recognition in accordance with an embodiment.

Referring to FIG. 5, a neural network structure 500 includes a first neural network 510 and a second neural network 520. The first neural network 510 includes a plurality of layers 511, 512, 513, 514, and 515, and the second neural network 520 includes a plurality of layers 521, 522, 523, 524, and 525. Although FIG. 5 illustrates a case in which five layers are included in each neural network, examples are not limited thereto. The number of layers included in each neural network may vary according to embodiment.

For example, a recognition apparatus recognizes an output 508 corresponding to a first task and an output 509 corresponding to a second task from an input 501 (for example, an image of a human face) based on the first neural network 510 and the second neural network 520.

The first task and the second task are different tasks. However, examples are not limited thereto, and the first task and the second task may be the same, similar, or related tasks. Further, the first task and the second task may be associated with each other with respect to at least one attribute. For example, the first task is facial expression recognition, and the second task is gender recognition. A feature map of the second neural network for gender recognition is employed, according to one or more embodiments, to contribute to improving a recognition rate of the first neural network for facial expression recognition. In this example, an associated attribute is related to a type of object having the same attribute subject for recognition, for example, a human. However, the tasks are not limited thereto. In a case in which image data is used as an input, the tasks include facial expression recognition, gender recognition, age recognition, identity recognition, body part recognition, fingerprint recognition, iris recognition, gesture recognition, pose recognition, and place recognition. In a case in which audio data is used as an input, the tasks include voice recognition, speech recognition, and music recognition. However, the object is not limited to a human. The object may include a thing, an animal, and a plant distinct from a background in an image.

The neural network structure 500 shows a structure in which inputs of layers 512, 513 and 514 of the first neural network 510 are connected to the layers 521, 522 and 523 of the second neural network 520. The recognition apparatus computes feature maps sequentially with respect to each layer of a neural network. As shown in FIG. 5, in response to the layer 522 of the second neural network 520 being connected to the input of the target layer 513, the recognition apparatus generates, as the input of the target layer 513, a result of applying an element-wise operation 505 to a first feature map output from the previous layer 512 and a second feature map output from the layer 522 of the second neural network 520, for example, an intermediate feature map. The recognition apparatus computes a target feature map based on the target layer 513 from the intermediate feature map which is the result of applying the element-wise operation 505 to the first feature map and the second feature map. The recognition apparatus transmits the target feature map to the next layer 514. The recognition apparatus repeats the above process with respect to the subsequent layers, up to the output layer 515 of the first neural network 510 and the output layer 525 of the second neural network 520.

The number of nodes included in a layer of the first neural network is equal to the number of nodes included in a layer connected to the first neural network. However, examples are not limited thereto, and the number of nodes may vary according to a design.

In another example, the first neural network 510 may be connected to a third neural network. In this example, the recognition apparatus computes a third feature map corresponding to at least one of the plurality of layers 511, 512, 513, 514, and 515 in the first neural network 510, and transmits the third feature map to the third neural network. As described above, connections among neural networks may expand to at least three neural networks.

Figure 6:
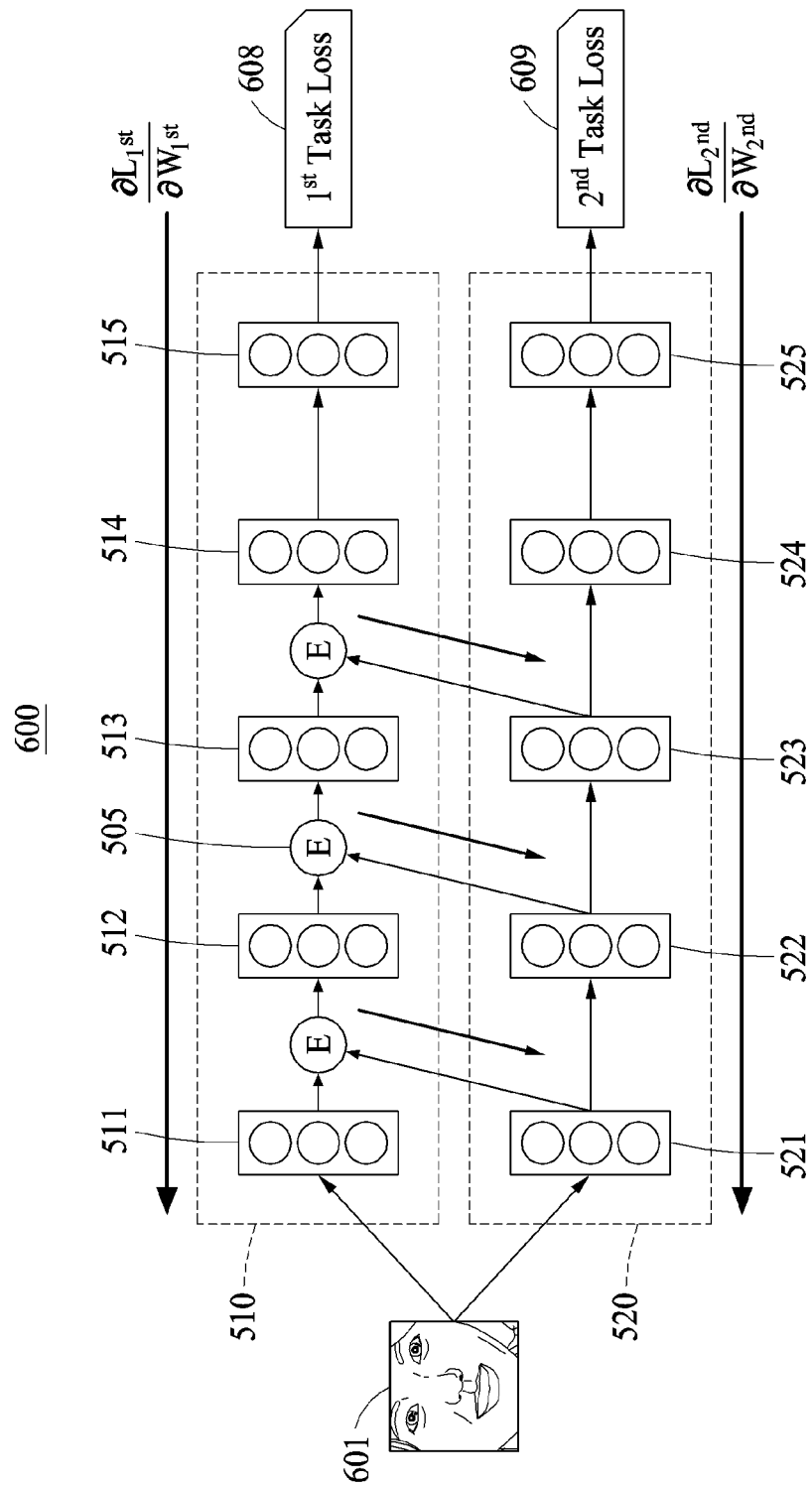
FIG. 6 illustrates an example of training a neural network structure, such as the one of FIG. 5.

FIG. 6 illustrates an example of training the neural network structure of FIG. 5.

Referring to FIG. 6, a training apparatus obtains the first neural network 510 including the plurality of layers 511, 512, 513, 514, and 515 and the second neural network 520 including the layers 521, 522, and 523 connected to the first neural network 510. For example, the first neural network 510 and the second neural network 520 included in a neural network structure 600 are stored in a memory of the training apparatus.

The training apparatus obtains training data. The training data include a training input 601 and a corresponding training output. For example, the training output is data indicating a value desired in response to the training input 601 being provided to a neural network. The training apparatus trains the neural network to generate the training output in response to the training input 601 being provided to the neural network. For example, the training apparatus trains the first neural network 510 to output a first training output with respect to the training input 601, and trains the second neural network 520 to output a second training output with respect to the training input 601.

For example, the training apparatus applies the element-wise operation 505 to a first feature map computed from the training input 601 based on a layer of the first neural network 510, and a second feature map computed from the training input 601 based on each of the layers 521, 522, and 523 connected to the first neural network 510 in the second neural network 520. For example, similar to the recognition apparatus described above, the training apparatus computes a first feature map corresponding to a target layer of the first neural network 510 and a second feature map corresponding to a layer connected to the target layer in the second neural network. Here, the training apparatus preprocesses the second feature map, and applies an element-wise operation to the first feature map and the preprocessed second feature map.

The training apparatus trains the first neural network 510 and the second neural network 520 based on a first training recognition result computed by the first neural network 510 through a result of the element-wise operation and the first training output corresponding to the training input 601. For example, the training apparatus back-propagates a loss 608 corresponding to the first raining recognition result and the first training output from the output layer 515 to the input layer 511 of the first neural network 510. The first training recognition result is an output computed by the training apparatus through the first neural network 510 with respect to the provided training input 601. The loss 608 corresponding to the first training recognition result and the first training output is expressed by $$\frac{\partial L_{1st}}{\partial W_{1st}}.$$

Here, $L_{1st}$ denotes a training loss in an output of a layer of the first neural network, and $W_{1st}$ denotes a connection weight of the first neural network.

Further, the training apparatus back-propagates the loss 608 corresponding to the first training recognition result and the first training output to the second neural network 520 through the layers connected to the first neural network 510. In addition, the training apparatus trains the second neural network 520 based on a second training recognition result computed by the second neural network 520 from the training input 601 and the second training output corresponding to the training input 601. For example, the training apparatus back-propagates a loss 609 corresponding to the second training recognition result and the second training output in a direction from the output layer 525 to the input layer 521 of the second neural network 520. The loss 609 corresponding to the second training recognition result and the second training output is expressed by $$\frac{\partial L_{2nd}}{\partial W_{2nd}}.$$

Here, $L_{2nd}$ denotes a training loss in an output of a layer of the second neural network, and $W_{2nd}$ denotes a connection weight of the second neural network.

As shown in FIGS. 5 and 6, a number of nodes included in a layer of the first neural network 510 is equal to a number of nodes included in a layer connected to the first neural network 510 in the second neural network 520.

Although FIG. 6 illustrates only the first neural network 510 and the second neural network 520, examples are not limited thereto and may vary according to a design. For example, at least one layer included in the first neural network 510 may be connected to a third neural network. In this example, the recognition apparatus and the training apparatus transmit a feature map from the layer of the first neural network 510 to a layer connected to the layer of the first neural network 510 in the third neural network. For example, the training apparatus trains the first neural network based on a third training recognition result computed by the third neural network and a third training output corresponding to the training input.

The training apparatus repeats training of the first neural network 510 and training of the second neural network 520 alternately until the losses 608 and 609 are less than a threshold loss. However, examples are not limited thereto. Training is terminated in response to the loss 608 of the first neural network 510 being less than a first threshold loss, or training is terminated in response to the loss 609 of the second neural network 520 being less than a second threshold loss. Further, instead of alternate training, the training apparatus repeats training of the first neural network 510, and initiates training of the second neural network 520 in response to the loss 608 of the first neural network 510 being less than the first threshold loss. The method, sequence, number of times, and criteria for training may vary according to embodiment.

Figure 7:
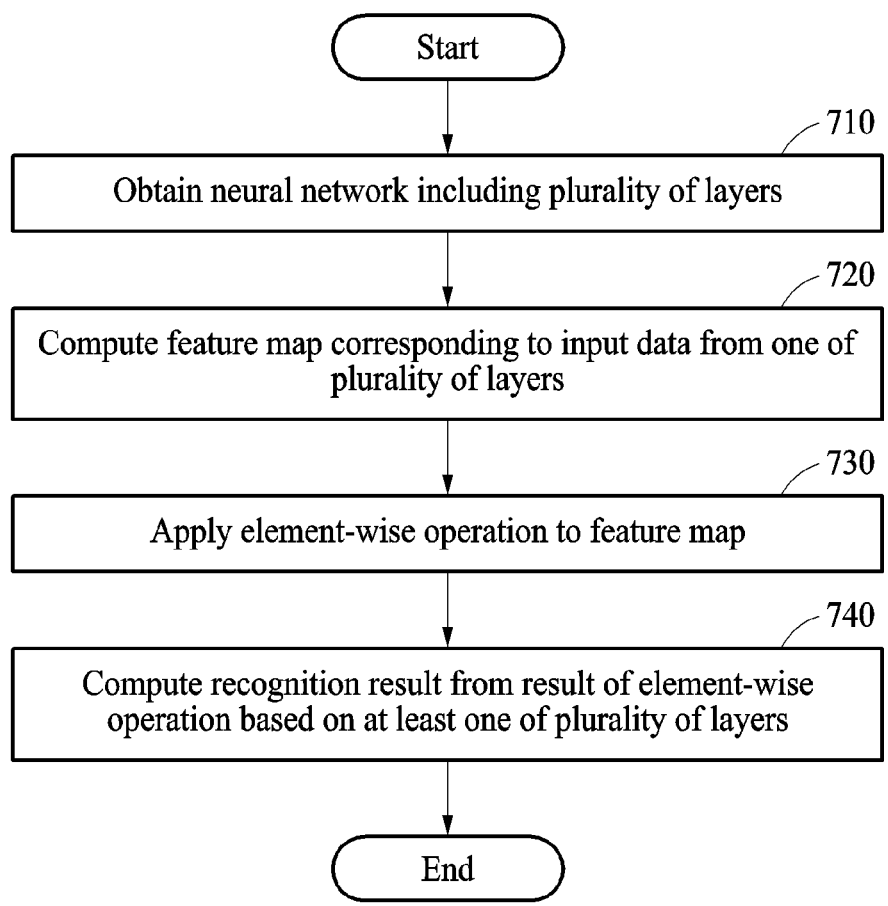
FIG. 7 is a flowchart illustrating an example of a recognition method in accordance with an embodiment.

FIG. 7 is a flowchart illustrating an example of a recognition method in accordance with an embodiment.

Referring to FIG. 7, in operation 710, a recognition apparatus obtains a neural network including a plurality of layers. Similar to the description provided with reference to FIG. 3, the recognition apparatus receives the neural network from an internal memory or an external device through communication.

In operation 720, the recognition apparatus computes a feature map corresponding to input data from one of the plurality of layers. The recognition apparatus computes the feature map from an output of a previous layer of a target layer based on the target layer among the plurality of layers.

In operation 730, the recognition apparatus applies an element-wise operation to the feature map. The recognition apparatus applies the element-wise operation to corresponding elements of feature maps. The recognition apparatus applies the element-wise operation of adding a first element included in a first feature map to a first element included in a second feature map, dividing the first element included in the first feature map by the first element included in the second feature map, or multiplying the first element included in the first feature map by the first element included in the second feature map.

In operation 740, the recognition apparatus computes a recognition result from a result of the element-wise operation based on at least one of the plurality of layers. For example, the recognition apparatus computes a feature map to be transmitted to a next layer of the target layer based on the result of the element-wise operation. The recognition apparatus computes feature maps of all layers sequentially, and generates an output of an output layer of the neural network as the recognition result.

Figure 8:
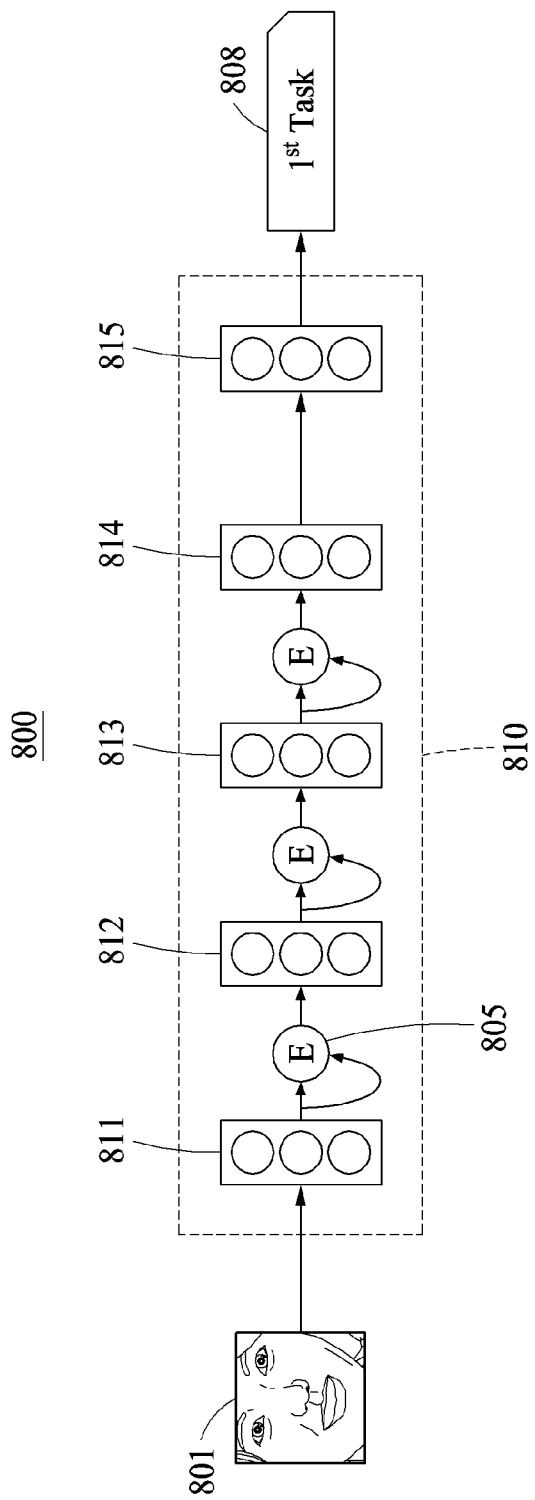
FIG. 8 illustrates an example of a neural network structure for recognition in accordance with an embodiment.

FIG. 8 illustrates an example of a neural network structure for recognition in accordance with an embodiment.

Referring to FIG. 8, a recognition apparatus generates a recognition result 808 from input data 801 based on a neural network structure 800. The neural network structure 800 includes only a first neural network 810, and the first neural network 810 includes a plurality of layers 811, 812, 813, 814, and 815.

The recognition apparatus uses, as an input of each layer, a result of applying an element-wise operation 805 which is based on an output of a previous layer of the corresponding layer to the corresponding output. The recognition apparatus uses, as the input, a result of applying an element-wise operation to outputs of a previous layer of each layer of the neural network structure 800, thereby generating a recognition result emphasizing features of the input data. An example of training the neural network structure 800 is described below with reference to FIG. 9.

Figure 9:
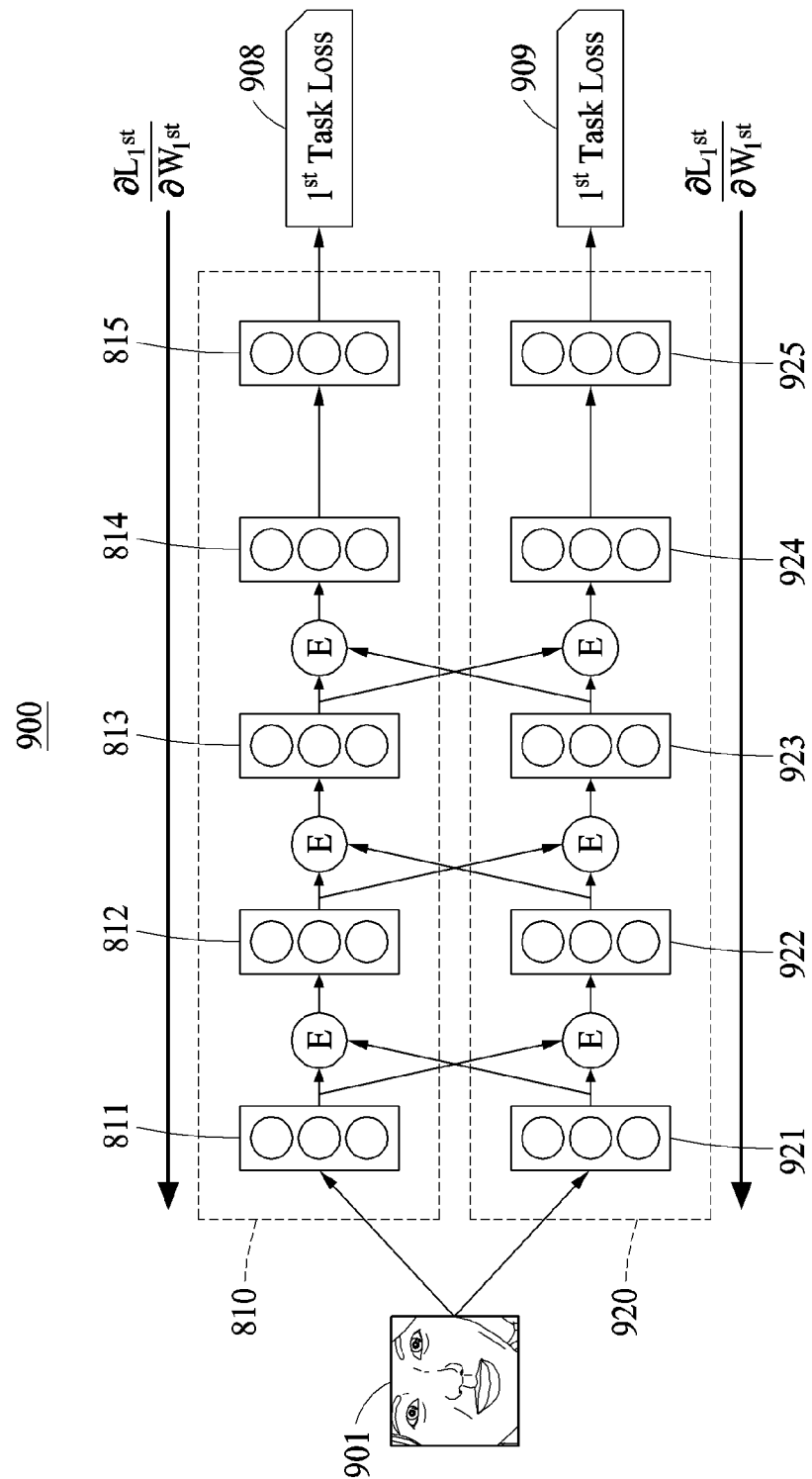
FIG. 9 illustrates an example of training a neural network structure, such as the one of FIG. 8.

FIG. 9 illustrates an example of training the neural network structure of FIG. 8.

Referring to FIG. 9, a training apparatus generates a second neural network 920 having the same layer structure as that of the first neural network 810 to train the neural network structure 800 of FIG. 8. For example, the training apparatus trains each neural network such that the first neural network and the second neural network include the same layer structures and parameters. In response to the training being completed, the training apparatus eliminates the second neural network 920 and applies the trained parameters to the first neural network 810, thereby changing a neural network structure 900 of FIG. 9 to the neural network structure 800 of FIG. 8.

The training apparatus obtains training data. Similar to the description provided with reference to FIG. 6, the training apparatus computes a feature map sequentially based on each layer with respect to a training input of the training data, and generates a training recognition result. In the process of computing a feature map, the training apparatus applies the element-wise operation 805 to a first feature map computed from a training input 901 based on each of the layers 811, 812, 813, 814, and 815 of the first neural network 810 and a second feature map computed from the training input 901 based on each of the layers 921, 922, 923, and 924 connected to the layers 811, 812, 813, and 814 of the first neural network 810 in the second neural network 920. The above training process is performed in a manner similar to the manner described with reference to FIG. 6. Further, the layers of the first neural network 810 and the second neural network 920 are connected to each other.

During training, a loss 908 with respect to a first training recognition result and a loss 909 with respect to a second training recognition result of the first neural network 810 correspond to different values. In a case in which purposes of the first neural network 810 and the second neural network 920 are the same, for example, the two neural networks are for face recognition, the first neural network 810 and the second neural network 920 are trained to reduce the two losses 908 and 909 to be less than a threshold loss. Here, a task of the first neural network 810 and a task of the second neural network 920 may be the same.

However, examples are not limited thereto. The first neural network 810 and the second neural network 920 may have the same layer structures, and be trained based on training data having different purposes. For example, the training apparatus trains the first neural network 810 to generate a first training output with respect to the training input, and trains the second neural network 920 to generate a second training output with respect to the training input. In response to the two losses 908 and 909 converging to values less than the threshold loss, the training apparatus generates the first neural network 810 in the structure as shown in FIG. 8, and sets the first neural network 810 to have the trained parameters. In this example, the trained first neural network 810 is a single neural network that generates recognition results with respect to two different types of tasks. The threshold loss may be based on the task and/or the input data and may vary, as would be known to one of skill in the art after gaining a thorough understanding of the disclosure.

FIG. 10 illustrates an example of an element-wise operation performed with respect to neural networks of FIG. 5.

Referring to FIG. 10, a neural network structure 1000 includes a first neural network 1010 and a second neural network 1020. The first neural network 1010 and the second neural network 1020 each include a plurality of layers as described above. However, for ease of description, examples will be described based on a target layer.

A recognition apparatus computes a resulting element $e^0$ by applying an element-wise operation to an individual element $e^1$ of a first feature map and an element $e^2$ corresponding to the individual element $e^1$ in a second feature map. The recognition apparatus generates a set of resulting elements as an intermediate feature map.

The recognition apparatus generates a first feature map $M^{1st}$ from a previous layer of a target layer in the first neural network 1010. At the same time, the recognition apparatus generates a second feature map $M^{2nd}$ from a layer connected to the target layer in the second neural network 1020. The recognition apparatus generates the intermediate feature map by applying an element-wise operation 1030 to the first feature map $M^{1st}$ and the second feature map $M^{2nd}$. For example, the recognition apparatus applies the element-wise operation 1030 which is based on a result of preprocessing the second feature map $M^{2nd}$ to the first feature map $M^{1st}$.

Herein, a preprocessing operation Pre( ) is an operation to be processed to apply the second feature map $M^{2nd}$ to the first feature map $M^{1st}$, for example, an operation to limit a range of a value of the second feature map $M^{2nd}$ or change a scale of the second feature map $M^{2nd}$. For example, reprocessing operation includes operations such as scaling, rescaling, sigmoid, ReLU, and hyperbolic tangent, as listed in Table 1.

TABLE 1

| Preprocessing type | Equation | Output range |
| --- | --- | --- |
| Scaling | $Pre(M^{2nd}) = \alpha \times M^{2nd}$ | — |
| Rescaling | $Pre(M^{2nd}) = \dfrac{M^{2nd} - \min(M^{2nd})}{\max(M^{2nd}) - \min(M^{2nd})}$ | 0~1 |
| Sigmoid | $Pre(M^{2nd}) = 1/(1 + \exp(-M^{2nd}))$ | 0~1 |
| ReLU | $Pre(M^{2nd}) = \max(0, M^{2nd})$ | 0~ |
| Hyperbolic Tangent | $Pre(M^{2nd}) = \tanh(M^{2nd})$ | −1~1 |

Herein, the element-wise operation 1030 is an operation to be applied to the second feature map $M^{2nd}$ and the first feature map $M^{1st}$, for example, a process of applying a predetermined operation to the corresponding elements $e^1$ and $e^2$, as described above. For example, the recognition apparatus applies a predetermined operation to an (i,j)-th element $e^1$ in the first feature map and an (i,j)-th element $e^2$ in the second feature map, for example, in a case of additive operation, adds the two elements, and determines an operation result to be an (i,j)-th element $e^0$ of the intermediate feature map. Although a two-dimensional feature map is used for ease of description, examples are not limited thereto. The feature map may extend to a three or higher dimensional feature map.

The element-wise operation 1030 includes an additive operation, a multiplicative operation, an average operation, a maximum operation, and a minimum operation, as listed in Table 2. The element-wise operation 1030 is an operation by a trained function f, rather than an existing mathematical operator. For example, it is defined as $M^{out}=f(M^{1st}, M^{2nd})$. Here, f denotes a non-linear complex function trained using a neural network.

TABLE 2

| Element-wise operation type | Equation |
| --- | --- |
| Additive operation | $M^{out} = M^{1st} \oplus M^{2nd}$ |
| Multiplicative operation | $M^{out} = M^{1st} \otimes M^{2nd}$ |
| Average operation | $M^{out} = (M^{1st} \oplus M^{2nd})/2$ |
| Maximum operation | $M^{out} = \max(M^{1st}, M^{2nd})$ |
| Minimum operation | $M^{out} = \min(M^{1st}, M^{2nd})$ |

Although the element-wise operation 1030 is performed with respect to two feature maps in the example of FIG. 10, examples are not limited thereto. The element-wise operation 1030 may extend to a case of at least three feature maps. For example, in a case of the average operation, the recognition apparatus determines a value obtained by dividing a sum of all corresponding elements in at least three feature maps by the number of the feature maps to be an element of the intermediate feature map. Further, the element-wise operation 1030 also includes a non-linear function.

Figure 11:
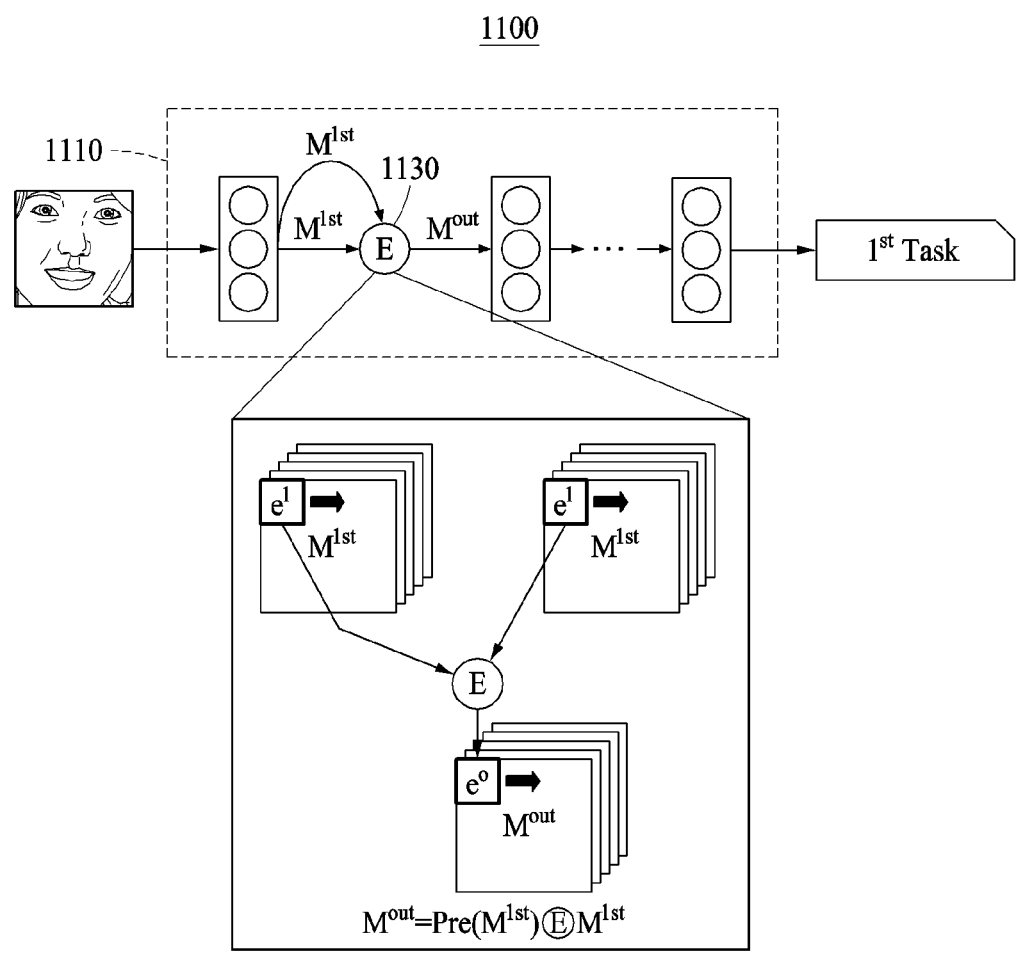
FIG. 11 illustrates an example of an element-wise operation performed with respect to a neural network, such as that of FIG. 8.

FIG. 11 illustrates an example of an element-wise operation performed with respect to a neural network of FIG. 8.

Referring to FIG. 11, a neural network structure 1100 includes only a first neural network 1110, similar to FIG. 8. In a single neural network structure as shown in FIG. 11, an element-wise operation 1130 is an operation using the first feature map $M^{1st}$ instead of the second feature map $M^{2nd}$ in the element-wise operation 1030 of FIG. 10. An element-wise operation performed using only outputs of layers in the first neural network 1110 as shown in FIG. 11 is referred to as a self element-wise operation.

FIGS. 12, 13, 14 and 15 illustrate examples of various neural network structures in accordance with one or more embodiments.

Figure 12:
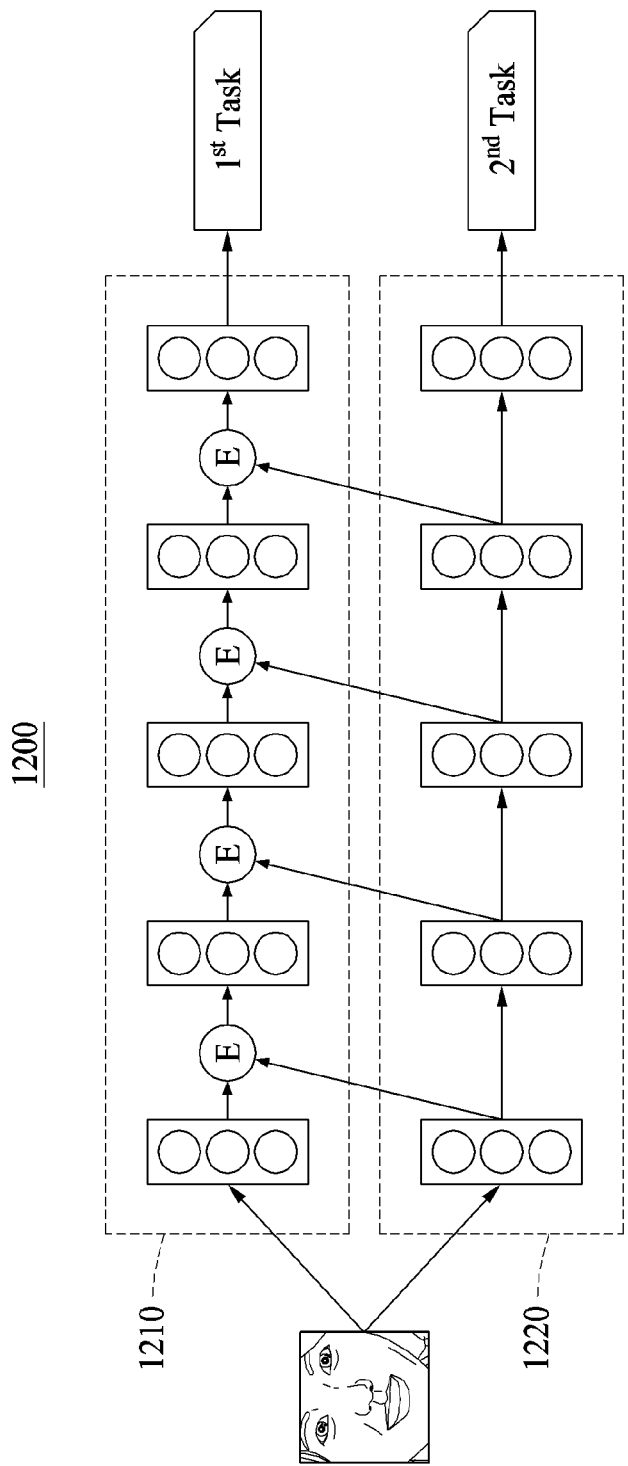
FIGS. 12, 13, 14 and 15 illustrate examples of various neural network structures in accordance with one or more embodiments.

FIG. 12 illustrates a neural network structure 1200 in which all layers of a second neural network 1220 are connected to all layers of a first neural network 1210, respectively. For example, the neural network structure 1200 is configured such that a feature map output from an (L−1)-th layer of the second neural network 1220 is transmitted to an L-th layer of the first neural network 1210, L being an integer greater than or equal to "1".

Figure 13:
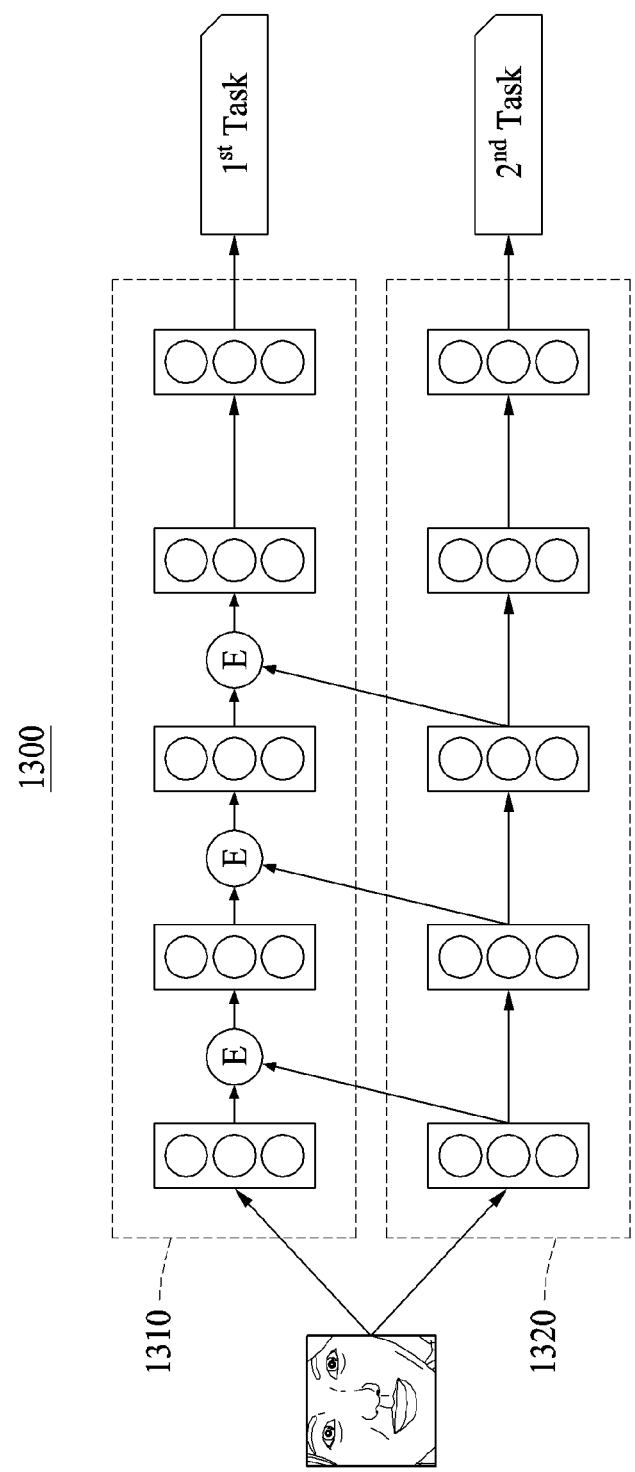

FIG. 13 illustrates a neural network structure 1300 in which layers of a second neural network 1320 are connected to layers corresponding to a front part of a first neural network 1310, respectively. For example, the neural network structure 1300 is configured such that an output of a first layer of the second neural network 1320 is transferred to a second layer of the first neural network 1310, an output of a second layer of the second neural network 1320 is transmitted to a third layer of the first neural network 1310, and an output of a third layer of the second neural network 1320 is transmitted to a fourth layer of the first neural network 1310.

Figure 14:
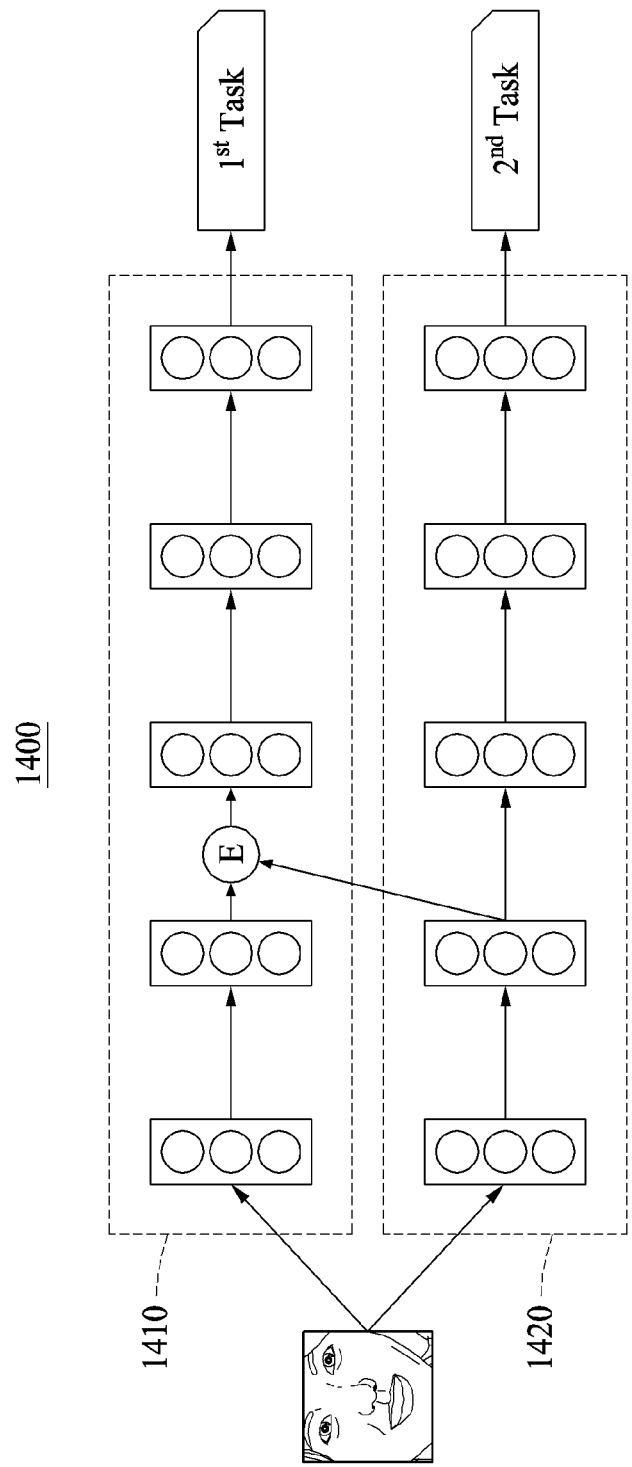

FIG. 14 illustrates a neural network structure 1400 configured such that an output of a second layer of a second neural network 1420 is transmitted to a third layer of a first neural network 1410.

As described above, various structures in which an output of at least one layer of a neural network is transmitted to another neural network are applied. The structures shown in FIGS. 12 through 14 are merely examples, and are not limited thereto.

Figure 15:
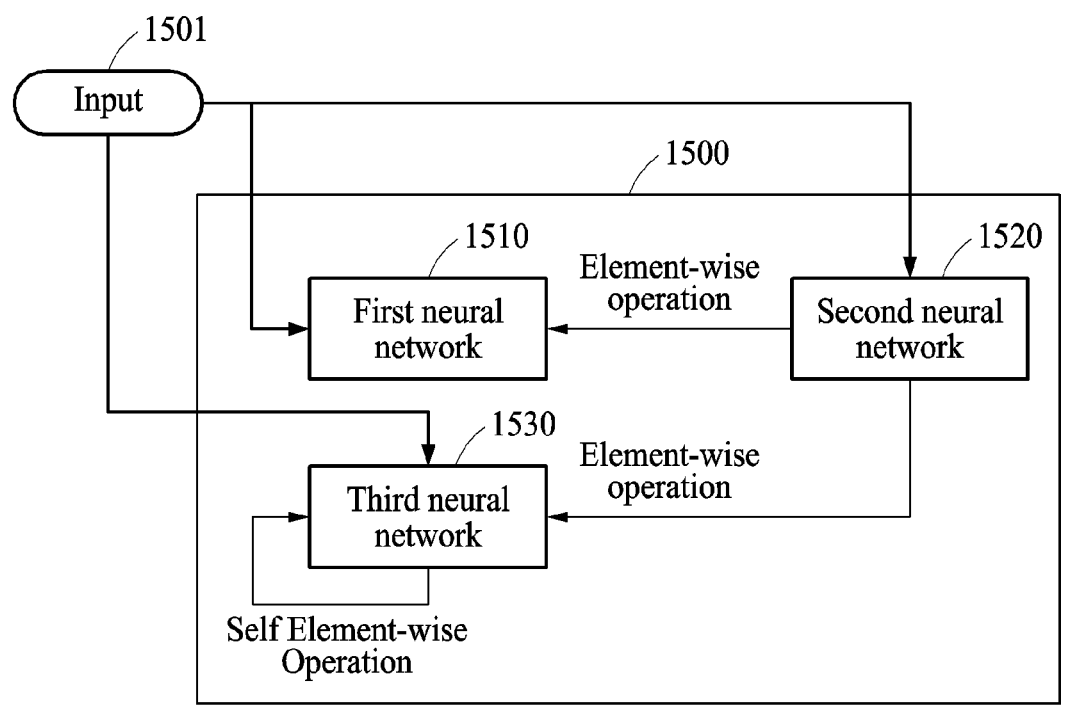

FIG. 15 illustrates an example of a neural network structure being extended.

Referring to FIG. 15, a recognition apparatus obtains a neural network structure 1500, and provides an input 1501 to the neural network structure 1500. The neural network structure 1500 includes a first neural network 1510, a second neural network 1520, and a third neural network 1530, and the same input 1510 is provided to each neural network.

The first neural network 1510 and the third neural network 1530 are configured to receive a feature map from the second neural network 1520 based on an element-wise operation. The third neural network 1530 further has a layer structure to which a self element-wise operation is applied.

The first neural network 1510 and the third neural network 1530 are configured to generate a recognition result by referring to a portion of the feature map extracted from the second neural network 1520. The third neural network 1530 is configured to generate the recognition result by further emphasizing self feature information.

For example, it may be assumed that the first neural network 1510 is trained to recognize a facial expression from a provided input image, for example, an image including at least a portion of a body such as a face of a user, the second neural network 1520 is trained to recognize a gender or age from the input image, and the third neural network 1530 is trained to recognize an identity of the user from the input image. In this example, the recognition apparatus recognizes the facial expression using the first neural network 1510 by referring to a portion of features used by the second neural network 1520 to recognize the gender or age, thereby providing an improved recognition rate. Further, the recognition apparatus recognizes the identity of the user using the third neural network 1530 by referring to the features used by the second neural network 1520 to recognize the gender or age and by emphasizing and referring to self features, thereby providing a faster and improved recognition performance.

Through a structure including a neural network connected to another neural network, the recognition apparatus performs recognition within a provided short time in a single neural network structure, and improves a recognition rate. Further, the recognition apparatus recognizes complex information through a single neural network at a time. For example, the recognition apparatus provides a provided single input to a single neural network and recognizes a facial expression, a gender, and an identity at a time.

The neural network structure reduces a size of memory, improves a recognition rate, and guarantees a recognition speed, and thus may be mounted in a mobile device.

Figure 16:
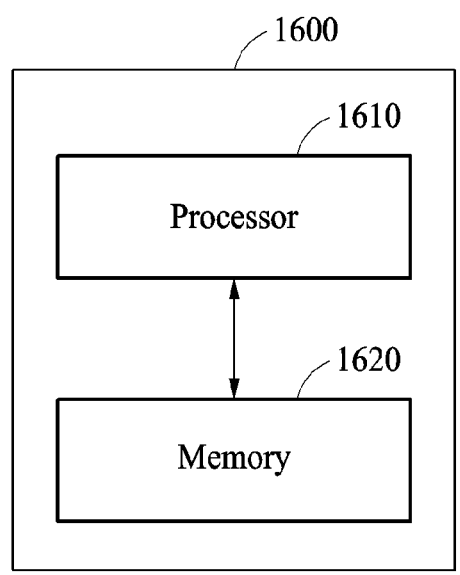
FIG. 16 is a block diagram illustrating a simplified example of a configuration of a recognition apparatus or a training apparatus according to one or more embodiments.

FIG. 16 is a block diagram illustrating an example of a configuration of a recognition apparatus or a training apparatus.

An apparatus 1600 of FIG. 16 is configured as a recognition apparatus or a training apparatus. The apparatus 1600 includes a processor 1610 and a memory 1620.

Although a single processor is provided, the processor 1610 may include a plurality of processors or cores. The processor 1610 operates inside a computing device having a plurality of multi-core processors, for example. In another example, each of the multi-core processors is a general purpose graphic processing unit (GPGPU). In another example, each of the multi-core processors is a field-programmable gate array (FPGA), or a customizable multi-core processor. In another example, the processor 1610 exchanges data through an internal bus, such as a peripheral component interconnect express (PCI-E) bus. In another example, the processor 1610 is a single-core processor.

The memory 1620 includes at least one instruction to be executed by the processor 1610. Further, the memory 1620 stores at least one of a neural network, a parameter, or training data.

In response to the apparatus 1600 being configured as a recognition apparatus, the processor 1610 of the recognition apparatus is configured to perform the operations described with reference to FIGS. 3 through 5, 7, 8, and 10 through 14.

For example, the processor 1610 computes a recognition result from input data based on a first neural network and a second neural network which are trained. The processor 1610 obtains the first neural network including a plurality of layers and the second neural network including a layer connected to the first neural network. The processor 1610 computes a first feature map from the input data based on a layer of the first neural network. The processor 1610 computes a second feature map from the input data based on the layer connected to the first neural network in the second neural network. The processor 1610 generates a recognition result based on the first neural network from an intermediate feature map computed by applying an element-wise operation to the first feature map and the second feature map.

The memory 1620 stores the neural networks described with reference to FIGS. 1 through 14. The memory 1620 stores the first neural network and the second neural network. Further, the memory 1620 stores parameters corresponding to layers of each trained neural network. Here, a parameter includes a connection line connecting nodes of a layer and a connection weight assigned to the connection line.

In response to the apparatus 1600 being configured as a training apparatus, the processor 1610 of the training apparatus is configured to perform the operations described with reference to FIGS. 6 and 9.

For example, the processor 1610 of the training apparatus obtains a first neural network including a plurality of layers and a second neural network including a layer connected to the first neural network. The processor 1610 applies an element-wise operation to a first feature map computed from a training input based on a layer of the first neural network and a second feature map computed from the training input based on the layer connected to the first neural network in the second neural network. The processor 1610 trains the first neural network and the second neural network based on a first training recognition result computed by the first neural network through a result of the element-wise operation and a first training output corresponding to the training input.

The memory 1620 stores training data. Further, the memory 1620 obtains and stores the first neural network and the second neural network. During training, the memory 1620 temporarily stores parameters corresponding to each neural network being trained. In response to the training being completed, the memory 1620 stores the trained parameters along with each neural network. The trained first neural network, the trained second neural network, and the parameters corresponding to each neural network are transmitted to the recognition apparatus.

The recognition apparatus performs object recognition such as face recognition and facial expression recognition, and may be implemented as a device such as a smart phone or smart TV. The recognition apparatus performs a number of types of tasks using a single neural network structure, the neural network structure in which an output of a layer of the second neural network is transmitted to the first neural network. Further, the recognition apparatus reduces a size of a memory without decreasing, but rather improving, a recognition speed or recognition rate while performing recognition with respect to a number of types of tasks using a single neural network structure having a limited depth. In particular, the recognition apparatus improves a recognition rate of a predetermined task without decreasing a recognition rate for recognizing an individual task.

The apparatuses, units, modules, devices, and other components illustrated in FIG. 16 that perform the operations described herein with respect to FIGS. 3 through 14 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3 through 14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented neural network recognition method, comprising:
    obtaining a first neural network comprising layers and a second neural network comprising a layer connected to the first neural network;
    determining a first feature map from input data based on a layer of the first neural network;
    determining a second feature map from the input data based on the layer connected to the first neural network in the second neural network; and
    generating a recognition result based on the first neural network from an intermediate feature map determined by applying an element-wise operation to the first feature map and the second feature map.

2. The method of claim 1, wherein the determining of the first feature map comprises determining the first feature map corresponding to the input data based on a previous layer of a target layer included in the first neural network.

3. The method of claim 2, wherein the generating of the recognition result includes generating the recognition result from the intermediate feature map based on a next layer of the target layer included in the first neural network.

4. The method of claim 1, wherein the determining of the second feature map comprises determining the second feature map corresponding to the input data based on a layer connected to a target layer included in the first neural network, among a plurality of layers included in the second neural network, and providing the second feature map to the first neural network.

5. The method of claim 1, further comprising:
preprocessing the second feature map and providing the preprocessed second feature map to the first neural network.

6. The method of claim 1, further comprising:
generating a recognition result from the input data based on the second neural network.

7. The method of claim 1, wherein a total number of nodes included in a layer of the first neural network is equal to a total number of nodes included in the layer connected to the first neural network.

8. The method of claim 1, further comprising:
determining a third feature map corresponding to at least one of plural layers in the first neural network, and providing the third feature map to a third neural network to generate a recognition result with respect to the third neural network.

9. The method of claim 1, further comprising:
determining a feature map of a target layer included in the first neural network based on the target layer from a feature map of a previous layer included in the first neural network in response to the target layer being connected to the previous layer.

10. The method of claim 1, wherein the generating of the recognition result comprises:
performing the applying of the element-wise operation to the first feature map and the second feature map by applying the element-wise operation to an individual element of the first feature map and an element corresponding to the individual element in the second feature map; and
generating the intermediate feature map based on results of the performed applying.

11. A non-transitory computer-readable storage medium storing program instructions that, when executed by a processor, cause the processor to perform the method of claim 1.

* * * * *